United States Patent
Partridge et al.

(10) Patent No.: US 7,234,488 B2
(45) Date of Patent: Jun. 26, 2007

(54) VALVE ASSEMBLY AND METHOD WITH SLOTTED PLATES AND SPHERICAL BALL PLUG

(75) Inventors: Charles C. Partridge, Houston, TX (US); Clayton L. Carroll, Katy, TX (US)

(73) Assignee: SPX Corporation, Charlotte, NC (US)

( * ) Notice: Subject to any disclaimer, the term of this patent is extended or adjusted under 35 U.S.C. 154(b) by 4 days.

(21) Appl. No.: 11/199,196

(22) Filed: Aug. 9, 2005

(65) Prior Publication Data

US 2007/0034267 A1 Feb. 15, 2007

(51) Int. Cl.
*F16K 5/10* (2006.01)
(52) U.S. Cl. .................... 137/625.32; 251/127
(58) Field of Classification Search .......... 137/625.31, 137/625.32; 251/121, 127; 138/43
See application file for complete search history.

(56) References Cited

U.S. PATENT DOCUMENTS

| | | | | |
|---|---|---|---|---|
| 4,364,415 A | * | 12/1982 | Polon | 137/625.32 |
| 4,610,273 A | * | 9/1986 | Bey | 137/625.32 |
| 4,889,163 A | | 12/1989 | Engelbertsson | 137/625.32 |
| 5,180,139 A | * | 1/1993 | Gethmann et al. | 251/127 |
| 5,218,984 A | * | 6/1993 | Allen | 137/1 |
| 5,332,004 A | | 7/1994 | Gethmann et al. | 137/625.32 |
| 5,524,863 A | * | 6/1996 | Davis | 251/127 |
| 5,680,889 A | * | 10/1997 | Boger | 137/625.32 |
| RE36,984 E | * | 12/2000 | Steinke | 137/625.33 |
| 6,161,584 A | * | 12/2000 | Hemme et al. | 137/625.37 |
| 6,520,209 B1 | * | 2/2003 | Lundqvist | 137/625.31 |
| 6,675,832 B1 | * | 1/2004 | Tran et al. | 137/613 |
| 6,913,042 B2 | * | 7/2005 | Tran | 137/625.3 |
| 7,011,109 B2 | * | 3/2006 | Tran et al. | 137/625.32 |

OTHER PUBLICATIONS

Neles-Jamesbury Bulletin B127-1; Q-Ball Series QD ANSI Class 150-600 Trunnion-Supported Severe-Service Flanged Ball Ccontrol Valves; 1993; pp. 1-7.

* cited by examiner

*Primary Examiner*—John Fox
(74) *Attorney, Agent, or Firm*—Baker & Hostetler LLP (57) ABSTRACT

A valve assembly, comprises a housing having an inlet, an outlet, and an internal volume; a pair of sealing rings and mounted to the housing; and a spherical plug rotatably disposed within the housing for contact with the seating rings, the spherical plug comprising a general spherical main body having a generally cylindrical bore therethrough; and a plurality of slotted plates longitudinally parallel to each other and parallel with the axis rotation of the spherical plug.

20 Claims, 8 Drawing Sheets

VALVE ASSEMBLY AND METHOD WITH SLOTTED PLATES AND SPHERICAL BALL PLUG

FIELD OF THE INVENTION

The present invention relates to a valve assembly for controlling fluid flow, and more particularly relates to a generally ball type valve which is rotatably mounted in a housing, for controlling fluid flow between open, closed and intermediate positions therethrough.

BACKGROUND OF THE INVENTION

For adjusting fluid flow, a wide variety of valve types are known. One type of valve is generally known as a ball valve. A ball valve has a plug or valve body mounted inside a valve housing. A bore or other passageway or passageways is provided through the valve body so that the valve body can be rotated between open, closed and intermediate flow positions. These valves sometimes face certain disadvantages however. For example, the pressure drop characteristic curve when plotted against the rotation of the valve body may have undesirably abrupt or sudden pressure changes. In some instances a more gradual pressure drop is desired. Also, commonly known valves are often subject to undesirable cavitation due to shape pressure transients or high speed flow around edges of the valve opening.

According, it would be desirable to have a fluid control valve that provides desirable characteristics and overcomes the above mentioned difficulties at least to some extent.

SUMMARY OF THE INVENTION

The foregoing needs are met, to a great extent, by the present invention, wherein in one aspect an apparatus and method is provided that in some embodiments provides a fluid control valve apparatus and method.

In accordance with one embodiment of the present invention a valve assembly comprises a housing having an inlet, an outlet, and an internal volume; a pair of sealing rings and mounted to the housing; and a valve body rotatably disposed within the housing for contact with the seating rings, the valve body comprising a generally spherical main body having a generally cylindrical bore therethrough; and a plurality of slotted plates longitudinally parallel to each other and parallel with the axis rotation of the valve body.

In accordance with another embodiment of the present invention a valve assembly comprises a housing having an inlet, an outlet, and an internal volume; sealing means mounted to the housing; and a valve body rotatably disposed within the housing for sealing contact with the sealing means, the valve body comprising a generally spherical main body having a generally cylindrical bore therethrough; and a plurality of slotted plates longitudinally parallel to each other and parallel with the axis of rotation of the valve body.

In accordance with yet another embodiment of the present invention a method of providing a valve assembly, having a housing having an inlet, an outlet, and an internal volume and a pair of sealing rings mounted to the housing comprises rotating a valve body rotatably disposed within the housing in contact with the sealing rings, the valve body comprising a generally spherical main body having a generally cylindrical bore therethrough; and a plurality of slotted plates longitudinally parallel to each other and parallel with the axis of rotation of the valve body.

In accordance with yet another embodiment of the present invention a valve body for use in a valve assembly having a housing having an inlet, an outlet, and an internal volume and a pair of sealing rings mounted to the housing and the valve body comprises a main body rotatably disposed within the housing for contact with the sealing rings, the main body comprising a generally spherical main body having a generally cylindrical bore therethrough; and a plurality of slotted plates longitudinally parallel to each other and parallel with the axis of rotation of the valve body.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
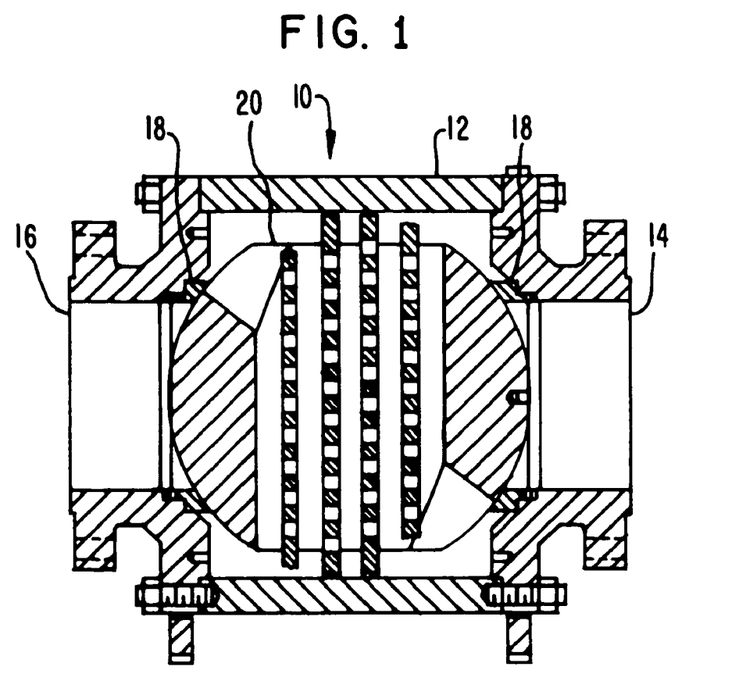
FIG. 1 is a cross-sectional view of a valve assembly according to a preferred embodiment of the invention, taken through line 1—1 in FIG. 4, and showing the valve in a closed position.
Figure 2:
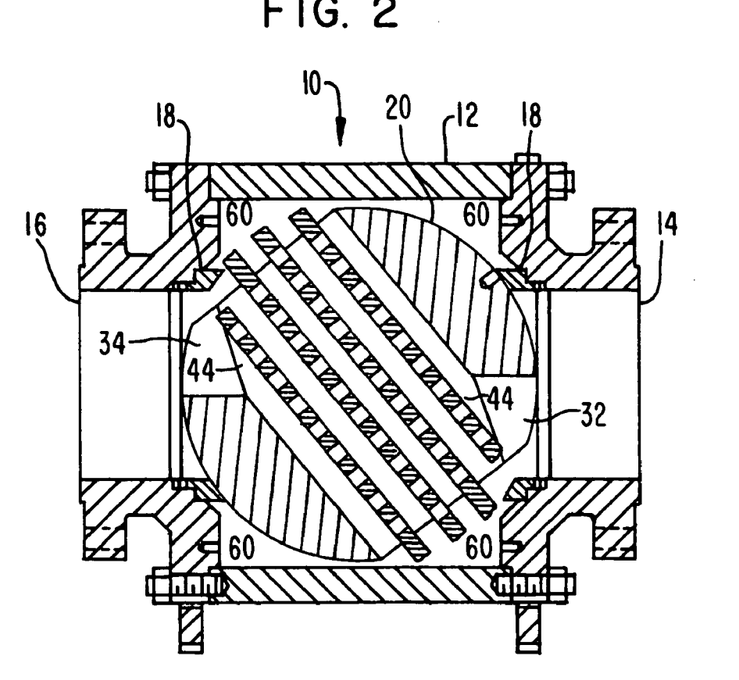
FIG. 2 is a cross-sectional view similar to FIG. 1, taken through line 2—2 in FIG. 5, and showing the valve in an intermediate open position.
Figure 3:
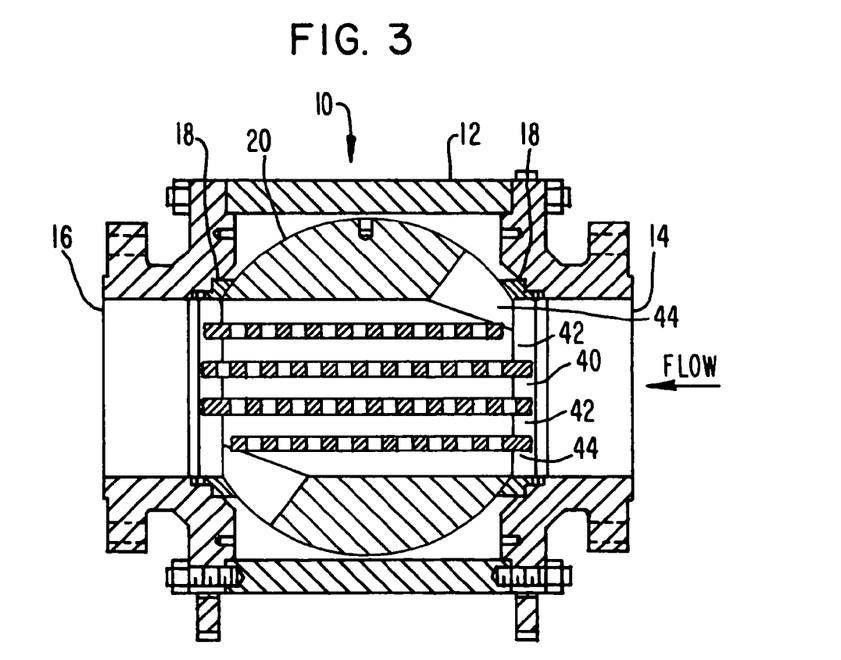
FIG. 3 is a cross-sectional view similar to FIG. 1, taken through line 3—3 in FIG. 6, and showing the valve in a fully open position.

The invention will now be described with reference to the drawing figures, in which like reference numerals refer to like parts throughout. FIGS. 1–3 are cross-sectional views of a valve assembly 10 according to a preferred embodiment of the invention, with FIG. 1 showing the valve assembly 10 in a closed position, FIG. 2 an intermediate open position, and FIG. 3 a fully opened position.

The valve assembly 10 includes an outer housing 12 that includes a first fluid connection port 14 and an opposed second fluid connection port 16. Because the valve assembly in this embodiment is symmetrical, either port 14 or port 16 can be the inlet and outlet ports, respectively. However, as an example FIG. 3 illustrates an arrow showing a flow direction entering port 14 and exiting port 16.

Figure 9:
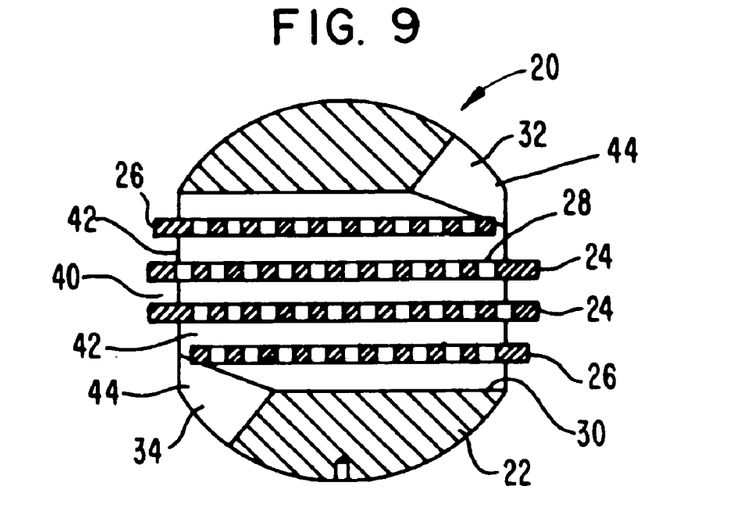
FIG. 9 is a cross-sectional view of a valve body in accordance with a preferred embodiment of the present position.
Figure 10:
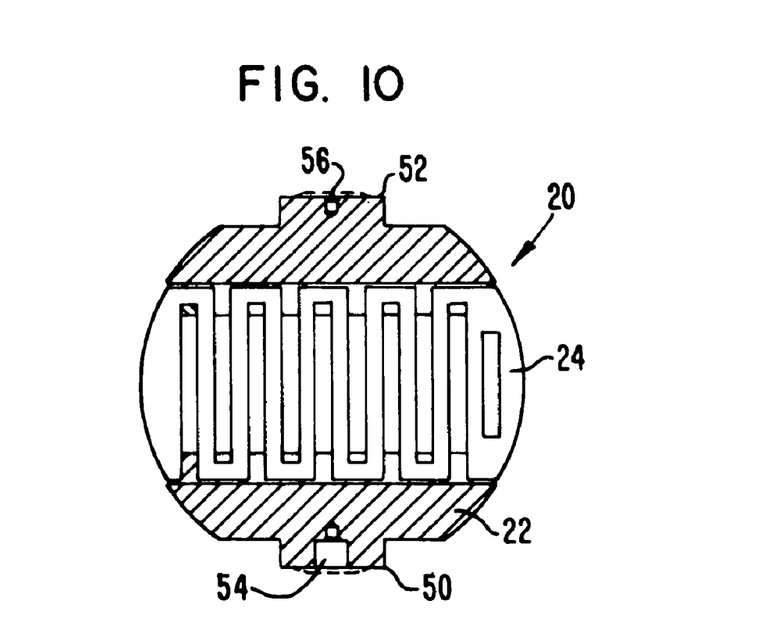
FIG. 10 is a cross-sectional view of the valve body of FIG. 9.
Figure 11:
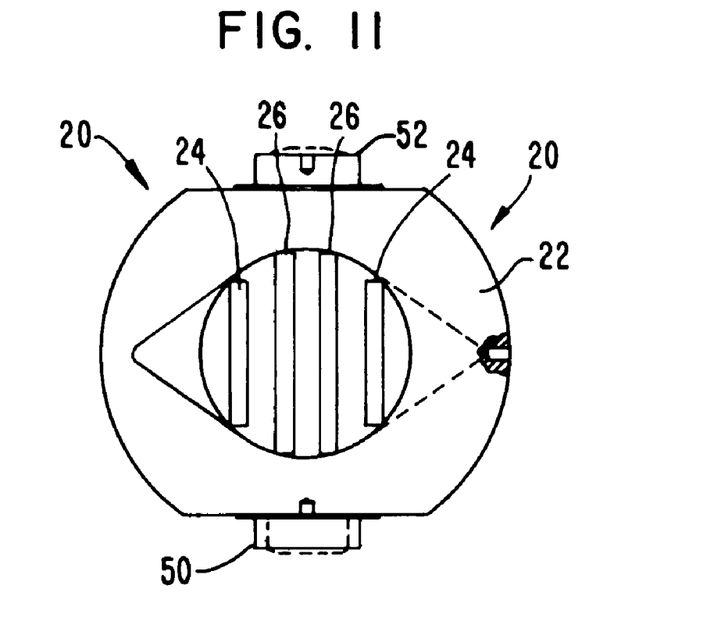
FIG. 11 is an end view of the valve body of FIG. 9.

The valve assembly 10 also includes a rotatably mounted generally spherical plug assembly 20 which is shown in more detail in FIGS. 9–11. As seen in FIGS. 9–11 the spherical plug assembly 20 includes a generally spherical main body 22 with an open central area that supports two larger inner slotted plates 24 and two somewhat shorter outer slotted plates 26. Each of the plates 24 and 26 has a zig zag shape forming slots 25 and 27, or alternatively has slots 25 and 27 cut therein. The main body 22 has a generally cylindrical bore 30 penetrating all the way therethrough, in which the plates 24 and 26 are mounted in parallel as shown. The generally cylindrical bore 30 also includes a tapered exit area 32 and an opposed and generally symmetrical tapered entrance area 34 as shown. The location of the plates 24 and 26 defines a number of flow channels or passages through the cylindrical bore 30, including a center channel 40, two intermediate channels 42, and two outer channels 44. Each of the outer channels 44 also open into one of the tapered entrances 32 and 34 respectively. The tapered entrances 32 and 34 are also noted as "v-slots".

In addition to the above mentioned features, FIGS. 10 and 11 show hinge post 50 and 52 which provide for rotatable mounting of the plug 20 in the housing 12 from FIG. 1. FIG. 10 further illustrates a slot connection 54 for attaching the plug to a control stem that rotates the spherical plug assembly 20.

A pair of sealing seats, which are capable of sealing contact with the valve body 20 are provided, as seen in FIGS. 1–3, with one seat 18 associated with the inlet port 14 and one seat 18 associated with the outlet port 16.

Figure 4:
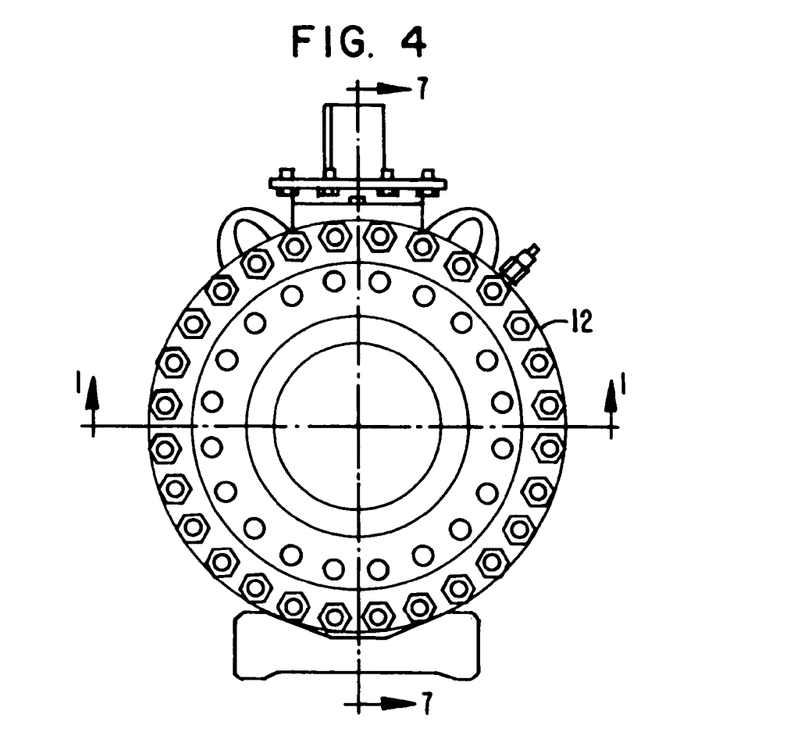
FIG. 4 is an end view of a valve assembly in a closed position.
Figure 7:
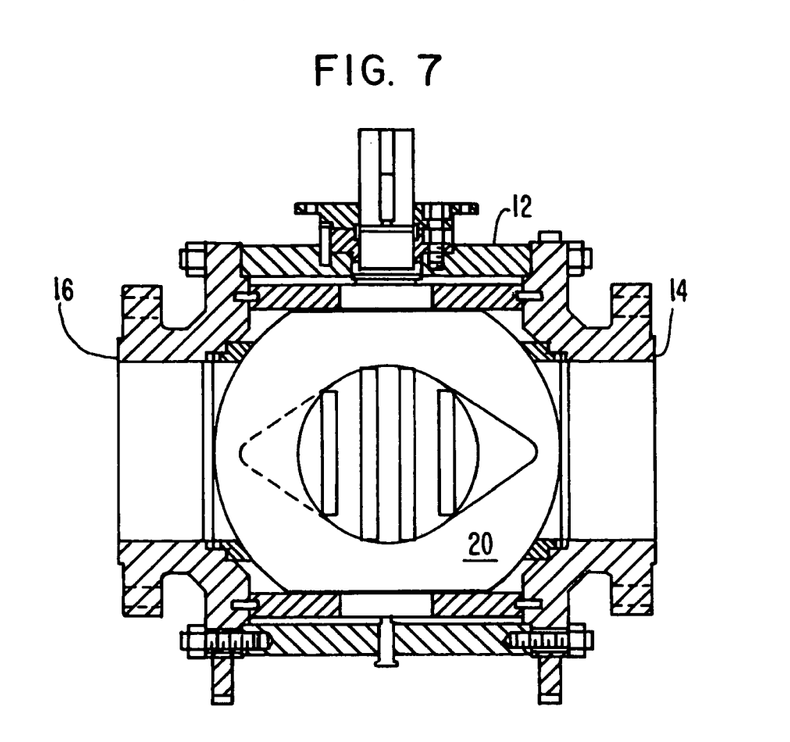
FIG. 7 is a cross-sectional view taken through line 7—7 in FIG. 4, and showing a valve assembly in a closed position.

The operation of the valve will now be described in more detail. FIGS. 1, 4 and 7 show the valve in a completely closed orientation. In this orientation, the fluid passages 40, 42 and 44 are completely blocked from the inlet 14 and the outlet 16.

Figure 5:
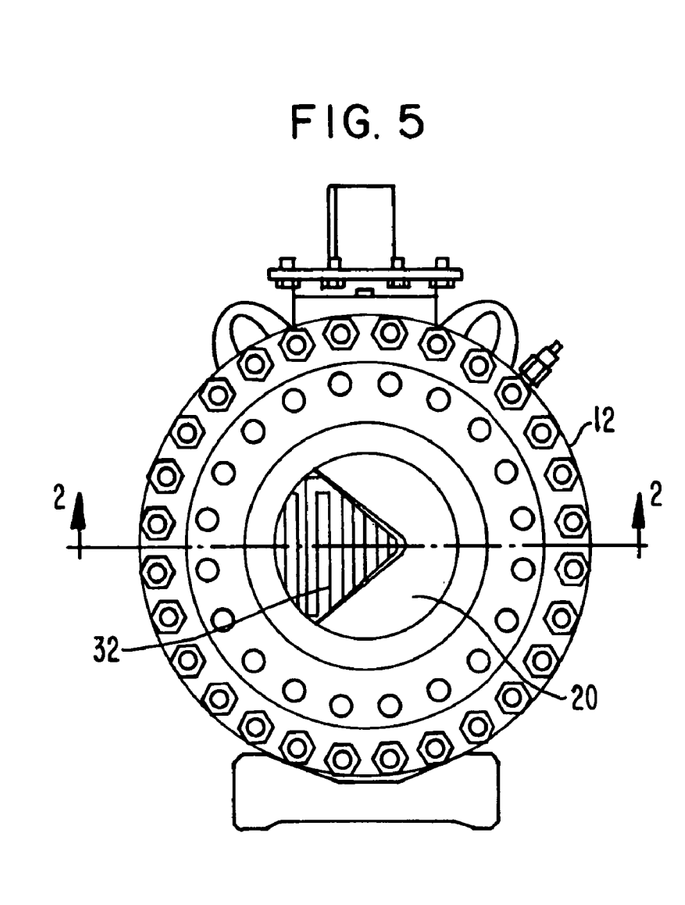
FIG. 5 is an end view of a valve assembly in an intermediate position.

FIGS. 2 and 5 show the valve in an intermediate position in which some flow is provided through the valve body 10. From the inlet 14, fluid will enter the tapered region 32. Some fluid will flow through the various slots 25 and 27 thereby passing through each of the plates 24 and 26 until exiting through the tapered region 34. In addition, because an annular space 60 is present around the body 20 in the corners of the valve housing surrounding the ball 20, fluid can also move from one channel 40, 42 and 44 to another adjacent channel 40, 42 and 44, and thus fluid that enters a channel 44 near the inlet 14 can also enter the other channels 40 and 42 and can exit out of the opposed channel 44 near the outlet end 16.

Figure 6:
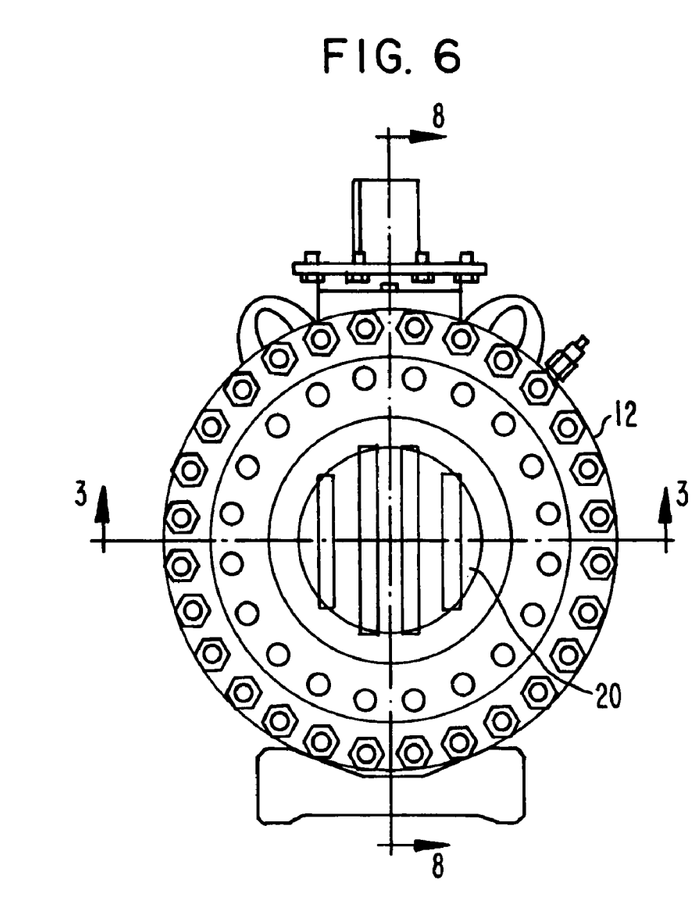
FIG. 6 is an end view of a valve assembly in an open position.
Figure 8:
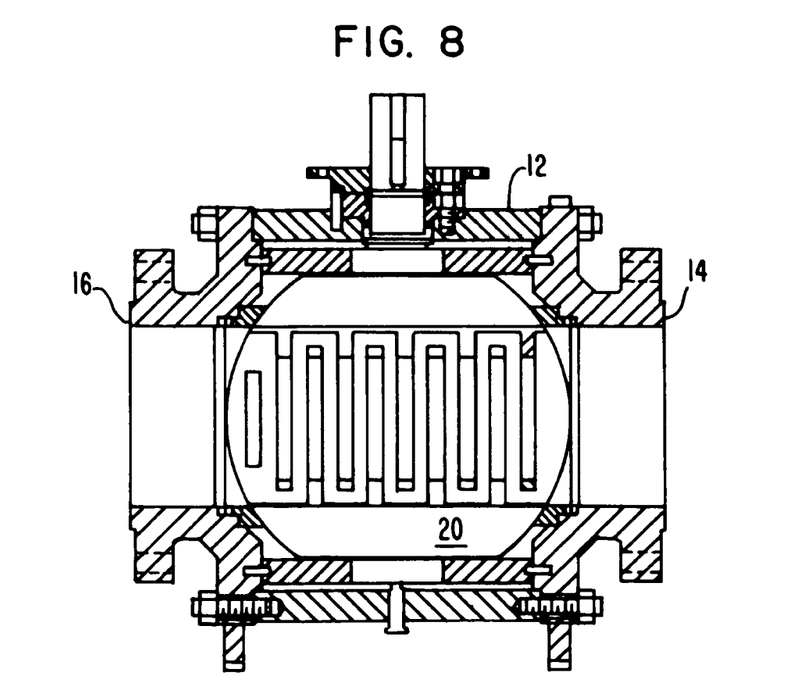
FIG. 8 is a cross-sectional view taken through line 8—8 in FIG. 6, and showing a valve in an open position.

FIGS. 3, 6, and 8 illustrate the valve assembly 10 in a fully open configuration in which flow primarily passes directly through the channels 40, 42 and 44 from the inlet end 14 to the outlet end 16.

Figure 12:
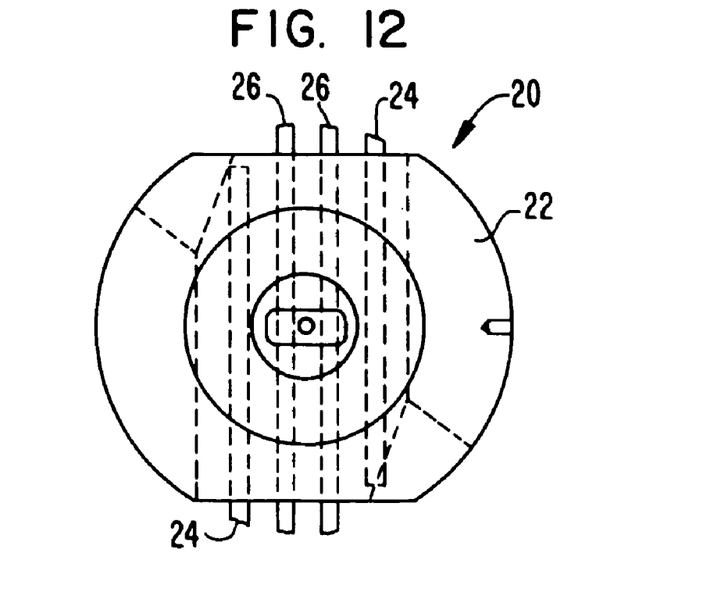
FIG. 12 is a top view of the valve body of FIG. 9.

FIG. 12 shows the plug assembly 20 from a different angle.

Figure 13:
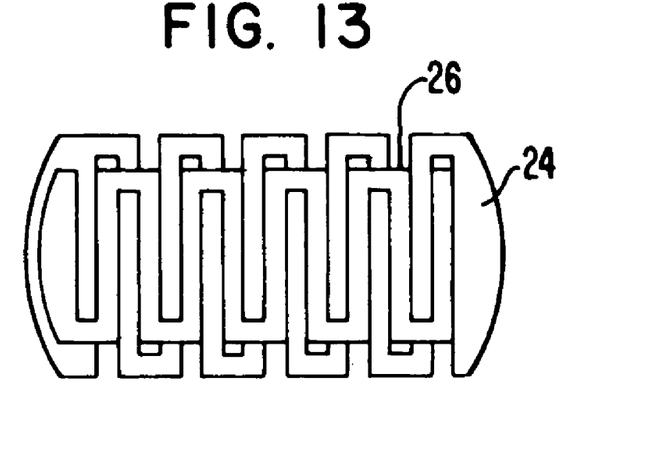
FIG. 13 is a side view showing two slotted plates superimposed to each other.
Figure 14:
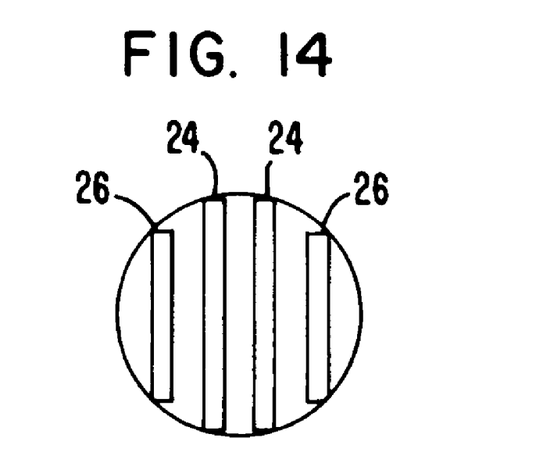
FIG. 14 is an end view showing four slotted plates lying in parallel and spaced apart from each.
Figure 15:
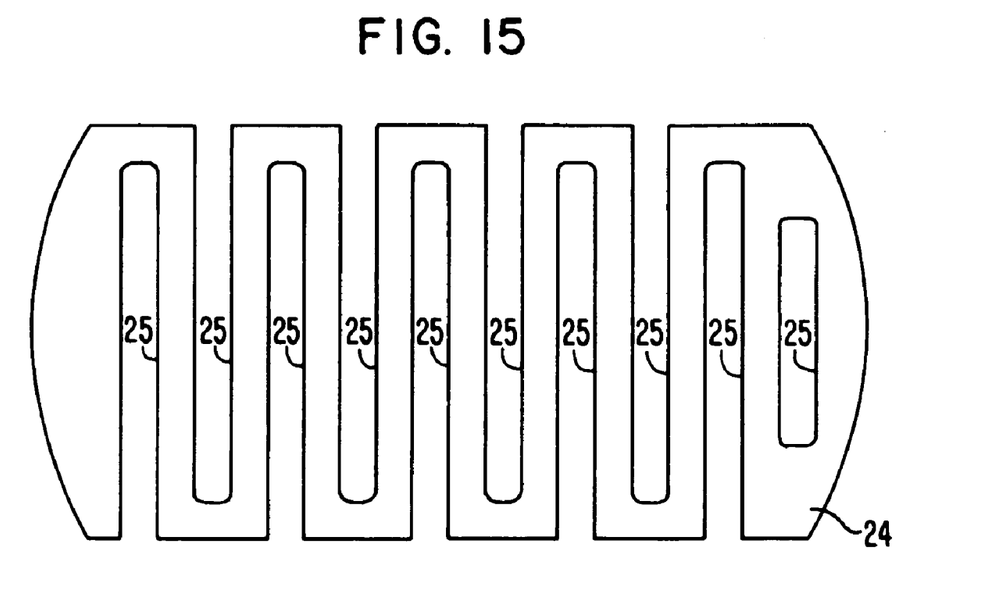
FIG. 15 is a plan view of a inner, larger, slotted plate.
Figure 16:
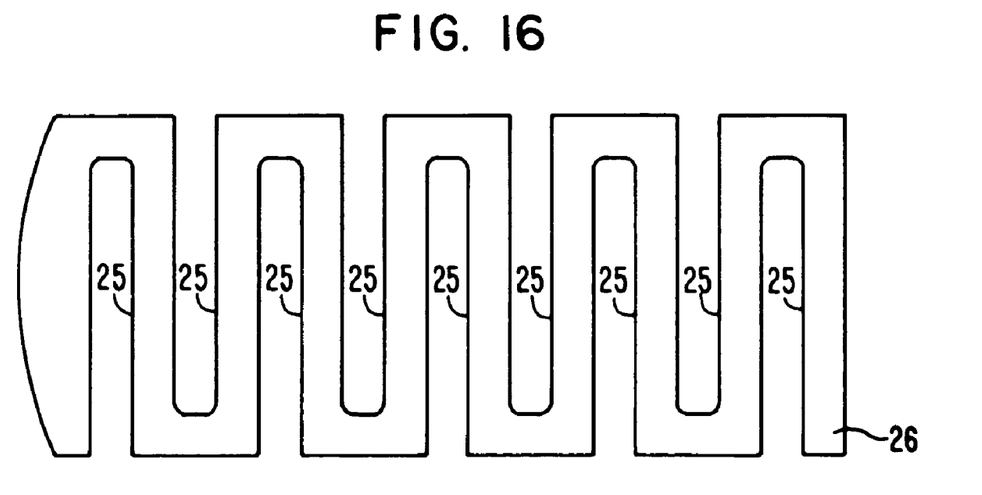
FIG. 16 is a plan view of an outer, smaller, slotted plate

FIG. 13 is a plan view showing a plate 26 on top of a plate 24. FIG. 14 is an end view showing the arrangement of the plates 26 within the cylindrical bore of the plug. FIGS. 15 and 16 are plan view of the large plate 24 and smaller plate 26 respectively.

The invention thus provides at least three mechanisms for gradually reducing pressure as the ball is rotated. First, the provision of the slots through the plates allows for damping of the pressure change. Second, the claims are exposed gradually as the valve is opened. Third, the tapered entrances 32 and 34 avoid sudden drops at the edge of the open and closed positions.

The arrangements described above can in some embodiments provide several advantages. First of all, it will be appreciated that the overall pressure drop occurs across six stages, two of them at the interaction of the balls with the seats, and four of them through the slots in the plates. The staged pressure drops has been found to desirably control cavitations and also provide desirable hydrodynamic noise attenuation properties compared to prior art devices. The use of the slots allows dimensions to be selected to pass large particles when dirty service with solid particles is needed. The illustrated embodiment is symmetrical and thus can be operated in bidirectional arrangements, when flow through the valve need to be reversed. The tapered v-slot provides better control for low flow conditions. It is also possible to install a mesh in the v-slots for cavitating liquid services with extremely high-pressure drops at low flow conditions.

Further, in the fully open position the plates occupy a relatively low amount of the flow cross-sectional area; in that the channels 40, 42 and 44 are wide and straight. Furthermore, the design can be at least to some extent self flushing, in that if a large piece of debris become blocked in a slot, when the valve if fully opened, the debris will tend to work itself from the slot and flow out through one of the channels 40, 42 and 44, particularly when the channels have a larger cross-sectional area then the width of the slot.

When the valve is in the closed position it is completely shut off like a standard API on off ball valve. As the valve starts to open up (0%–40% open) the flow goes through the upstream tapered entrance or v-slot (first stage of drop) and then passes through the slots in the parallel slotted plates (four stages of drop) then passes through the outlet tapered exit or v-slot (sixth stage of drop). As the valve goes through between 40%–50% open the flow starts to bypass the outer plates and the valve will exhibit a four stage drop (2 through the seats, 2 through the inner plates). As the valve goes between 50% open to 100% open, the flow will bypass the outer plates and give the maximum flow velocity.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A valve assembly, comprising:
   a housing having an inlet, an outlet, and an internal volume;
   a pair of sealing rings and mounted to the housing; and
   a spherical plug rotatably disposed within the housing for contact with the seating rings, the spherical plug comprising:
      a generally spherical main body having a generally cylindrical bore therethrough; and
      a plurality of slotted plates longitudinally parallel to each other and parallel with the axis rotation of the spherical plug, wherein the slotted plates are spread apart from each other and comprise a plurality slots each having a rectangular geometry, wherein each of said slots is at least as wide as the bore at the location of the respective plate.

2. The valve assembly of claim 1, wherein the spherical plug further comprises a first v-shaped tapered opening leading into the cylindrical bore.

3. The valve assembly of claim 2, wherein the spherical plug further comprises a second v-shaped tapered opening leading into the cylindrical bore.

4. The apparatus of claim 1, wherein the spherical plug comprises four slotted plates spaced apart from each other to define five flow channels through the spherical plug.

5. The apparatus according to claim 4, wherein the slotted plates have slots having a width that is less than a height of the flow channels.

6. A valve assembly, comprising:
   a housing having an inlet, an outlet, and an internal volume;
   sealing means mounted to the housing; and
   a spherical plug rotatably disposed within the housing for sealing contact with the sealing means, the spherical plug comprising:
      a generally spherical main body having a generally cylindrical bore therethrough; and
      a plurality of slotted plates longitudinally parallel to each other and parallel with the axis of rotation of the spherical plug, wherein the slotted plates are spread apart from each other and comprise a plurality slots each having a rectangular geometry, wherein each of said slots is at least as wide as the bore at the location of the respective plate.

7. The valve assembly of claim 6, wherein the spherical plug further comprises a first v-shaped tapered opening leading into the cylindrical bore.

8. The valve assembly of claim 7, wherein the spherical plug further comprises a second v-shaped tapered opening leading into the cylindrical bore.

9. The apparatus of claim 6, wherein the spherical plug comprises four slotted plates spaced apart from each other to define five flow channels through the spherical plug.

10. The apparatus according to claim 9, wherein the slotted plates have slots having a width that is less than a height of the flow channels.

11. A method of providing a valve assembly, having a housing having an inlet, an outlet, and an internal volume and a pair of sealing rings mounted to the housing; comprising:
    rotating a spherical plug rotatably disposed within the housing in contact with the sealing rings, the spherical plug comprising:
       a generally spherical main body having a generally cylindrical bore therethrough; and
       a plurality of slotted plates longitudinally parallel to each other and parallel with the axis of rotation of the spherical plug, wherein the slotted plates are spread apart from each other and comprise a plurality slots each having a rectangular geometry, wherein each of said slots is at least as wide as the bore at the location of the respective plate.

12. The valve assembly of claim 11, wherein the spherical plug further comprises a first v-shaped tapered opening leading into the cylindrical bore.

13. The valve assembly of claim 12, wherein the spherical plug further comprises a second v-shaped tapered opening leading into the cylindrical bore.

14. The apparatus of claim 11, wherein the spherical plug comprises four slotted plates spaced apart from each other to define five flow channels through the spherical plug.

15. The apparatus according to claim 14, wherein the slotted plates have slots having a width that is less than a height of the flow channels.

16. A spherical plug for use in a valve assembly having a housing having an inlet, an outlet, and an internal volume and a pair of sealing rings mounted to the housing and the valve body comprises:
    a spherical plug rotatably disposed within the housing for contact with the sealing rings, the spherical plug comprising:
       a generally spherical main body having a generally cylindrical bore therethrough; and
       a plurality of slotted plates longitudinally parallel to each other and parallel with the axis of rotation of the spherical plug, wherein the slotted plates are spread apart from each other and comprise a plurality slots each having a rectangular geometry, wherein each of said slots is at least as wide as the bore at the location of the respective plate.

17. The valve assembly of claim 16, wherein the spherical plug further comprises a first v-shaped tapered opening leading into the cylindrical bore.

18. The valve assembly of claim 17, wherein the spherical plug further comprises a second v-shaped tapered opening leading into the cylindrical bore.

19. The apparatus of claim 16, wherein the spherical plug comprises four slotted plates spaced apart from each other to define five flow channels through the spherical plug.

20. The apparatus according to claim 19, wherein the slotted plates have slots having a width that is less than a height of the flow channels.

* * * * *